United States Patent [19]

Okita et al.

[11] Patent Number: 4,483,901
[45] Date of Patent: Nov. 20, 1984

[54] SELECTIVELY GAS-PERMEABLE COMPOSITE MEMBRANE AND PROCESS FOR PRODUCTION THEREOF

[75] Inventors: Koichi Okita; Sigeru Asako, both of Osaka, Japan

[73] Assignee: Sumitomo Electric Industries, Ltd., Osaka, Japan

[21] Appl. No.: 486,179

[22] Filed: Apr. 18, 1983

[30] Foreign Application Priority Data

Apr. 16, 1982 [JP] Japan ................................. 57-64506

[51] Int. Cl.³ ............................ B05D 3/06; B32B 9/04
[52] U.S. Cl. ................................... 428/315.5; 55/158; 427/34; 427/40; 427/41; 428/315.5; 428/315.7; 428/316.6; 428/447
[58] Field of Search ............... 55/16, 158; 204/159.13; 427/34, 39, 40, 41, 245; 428/304.4, 315.5, 315.7, 316.6, 447

[56] References Cited

U.S. PATENT DOCUMENTS

| | | | |
|---|---|---|---|
| 3,767,737 | 10/1973 | Lundstrom | 55/158 |
| 4,137,365 | 1/1979 | Fletcher et al. | 427/40 |
| 4,230,463 | 10/1980 | Henis et al. | 55/158 |
| 4,239,793 | 12/1980 | Matsuura et al. | 428/447 |
| 4,344,981 | 8/1982 | Imada et al. | 427/41 |
| 4,366,184 | 12/1982 | Auerbach et al. | 427/41 |

Primary Examiner—William J. Van Balen
Attorney, Agent, or Firm—Sughrue, Mion, Zinn, Macpeak & Seas

[57] ABSTRACT

A selectively gas-permeable composite membrane and a process for producing said composite membrane are described. The composite membrane comprises a polymeric material support and a thin membrane deposited on the support, said thin membrane being obtained by glow discharge plasma polymerization of an organosilane compound containing at least one double bond or triple bond. Alternatively, the composite membrane comprises a polymeric material support having an average pore diameter of at least 0.1 micron, a hardened or cross-linked polyorganosiloxane layer on the support, and a thin membrane on the polyorganosiloxane layer, said thin membrane being obtained by plasma polymerization due to glow discharge of an organosilane compound containing at least one double bond or triple bond.

11 Claims, 1 Drawing Figure

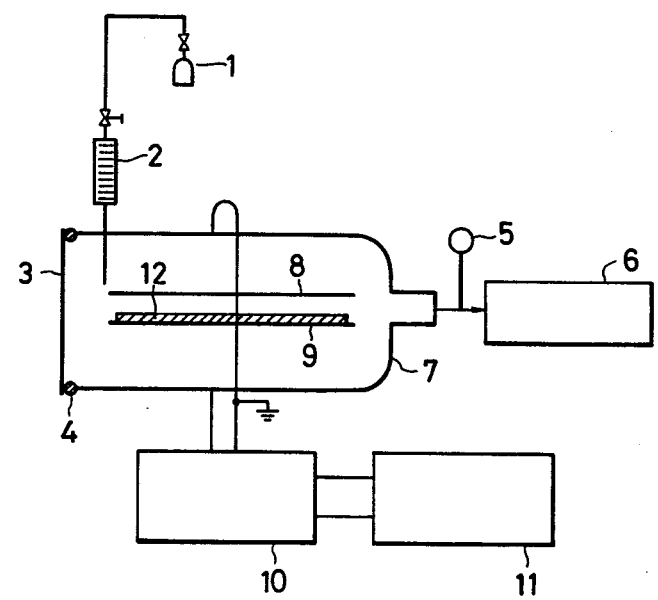

SELECTIVELY GAS-PERMEABLE COMPOSITE MEMBRANE AND PROCESS FOR PRODUCTION THEREOF

FIELD OF THE INVENTION

The present invention relates to a selectively gas-permeable composite membrane, and a process for producing said composite membrane.

BACKGROUND OF THE INVENTION

In recent years, it has been extensively investigated to perform separation and purification of fluid mixtures using selectively permeable membranes in place of processes, such as distillation and condensation, in which changes in phase are involved, consuming a large amount of energy.

Most of the processes for separation and purification of fluid mixtures utilizing membranes that have been put to practical use on a commercial scale are directed to liquid-liquid separation, such as production of pure water from sea water, disposal of factory wastes, and concentration of juices, and liquid-solid separation. Almost no process for gas-gas separation has been put to practical use. One of the reasons for this is that selective permeability is low; i.e., since there is no available membrane which allows a specific gas to pass therethrough, while almost completely preventing another gas from doing so, the production of gas of high purity needs a multistage process in which membrane separation is repeated many times. Therefore, a large-sized equipment is required. Another reason is that because of low gas permeability, it is difficult to process a large amount of gas. Moreover, in general, there has been the tendency that when selective permeability is increased, gas permeability is reduced, whereas when the gas permeability is increased, the selective permeability is reduced.

Various producing processes for membrane have been developed to improve the characteristics of selectively permeability and gas permeability. Typical production method is provided by casting a polymer solution to form an asymmetrical membrane, of which active skin layer has a greatly reduced thickness, as described in U.S. Pat. No. 4,230,463 and another method in which an ultra thin membrane corresponding to the active skin layer is prepared independently and joined together with a porous support to form a composite membrane as described in U.S. Pat. No. 3,767,737. These methods, however, are not necessarily satisfactory for commercial use. The methods are not commercially available because the required polymers or copolymers which are satisfactory in all the respects of selective permeability, permeability, heat resistance, chemical resistance, strength, and so forth are not commercially available.

Accordingly, the present invention is intended to produce those membranes which have satisfactory physical properties, such as selective permeability, permeability, heat resistance, chemical resistance, and strength, by using not only a single material, but by using different materials in combination.

SUMMARY OF THE INVENTION

The present invention relates to a selectively gas-permeable composite membrane comprising a polymeric material support and an ultra thin membrane deposited on the support, said ultra thin membrane being obtained by polymerization of polymerizable organosilane-based monomers in low temperature plasma generated by glow discharge.

BRIEF DESCRIPTION OF THE DRAWING

The FIGURE is a schematic diagram of a plasma polymerization apparatus as used in the examples of the present invention.

DETAILED DESCRIPTION OF THE INVENTION

Polymerizable organosilane-based monomers as used herein are compounds containing at least one unsaturated functional group containing a double bond or triple bond. Typical examples of such unsaturated functional groups include a vinyl group and an ethynyl group. Thus, these compounds can be represented by the general formula:

$$R_n\text{—Si—}X_{4-n}$$

wherein
n = 1 to 4;
R = $CH_2\text{=}CH\text{—}$, $CH\text{≡}C\text{—}$, or $CH_2\text{=}CH\text{—}CH_2\text{—}$; and
X = H, Cl, $CH_3\text{—}$, or $CH_3\text{—}CH_2\text{—}$.

In addition, the functional group, R, may be $CH_2\text{=}C(CH_3)\text{—}$, $CH_3\text{—}C\text{≡}C\text{—}$, $CH_2\text{=}CH\text{—}CH(CH_3)\text{—}$, or $CH_2\text{=}C(CH_3)\text{—}CH_2\text{—}$. Preferably, R is $CH_2\text{=}CH\text{—}$, $CH\text{≡}C\text{—}$ or $CH_2\text{=}CH\text{—}CH_2\text{—}$ and more preferably $CH_2\text{=}CH\text{—}$ or $CH\text{≡}C\text{—}$. High boiling compounds represented by the above-described general formula in which the functional group, X, is Br, I, $CH_3\text{—}CH_2\text{—}CH_2\text{—}$, $CH_3\text{—}CH(CH_3)\text{—}$, or $CH_3\text{—}C(CH_3)_2\text{—}$ are also included in the scope of the invention. When n is 2, 3 or 4, X may be any of H, Cl, and $CH_3$, with $CH_3$ being preferred.

Preferably, these organosilane compounds have a boiling point of less than 200° C. at atmospheric pressure. More preferred are those organosilane compounds having a boiling point of less than 130° C. When the boiling point is higher than 200° C., it sometimes becomes difficult to feed a sufficient concentration of monomer into the glow discharge atmosphere.

Organosilane compounds meeting all the above-described requirements include dimethylvinylchlorosilane, trimethylvinylsilane, methyltrivinylsilane, tetravinylsilane, ethynyltrimethyldichlorosilane, and allyltrimethylsilane. In addition, methylvinylsilane, allyldimethylvinylsilane, allyldimethylsilane, and allyldimethylchlorosilane can be used.

Preferred examples of the organosilane compounds include dimethylvinylchlorosilane, trimethylvinylsilane, methyltrivinylsilane, tetravinylsilane and ethynyltrimethylsilane, with methylvinylsilane and ethynyltrimethylsilane being particularly preferred.

On the other hand, it has been surprisingly found that oxygen-containing organosilanes, such as triethoxyvinylsilane which is used as a silane coupling agent, are not suitable for use as monomers for plasma polymerization.

The polymeric material support may be any suitable material selected from commercially available materials. From a viewpoint of heat resistance and strength, polysulfone, polyimide, polypropylene, polytetrafluoroethylene, etc., are preferred, but they are somewhat inferior in gas permeability. Silicone rubbers derived from various siloxanes, natural rubber, polybutadiene, etc., have high gas permeability, but suffer from the serious disadvantage that the strength is poor.

In accordance with the present invention, it has been found that polymer materials which are somewhat inferior in gas permeability but have a high strength can be divided into two groups depending upon a pore size of materials, materials having an average pore diameter of less than 0.1 micron and materials having an average pore diameter of at least 0.1 micron. They can be used appropriately depending on the average pore diameter. That is, in the case of the former materials having an average pore diameter of less than 0.1 micron, a plasma polymeric material can be deposited directly on the surface thereof, whereas the latter materials having an average pore diameter of at least 0.1 micron can be converted into composite polymer supports having excellent permeability, heat resistance, and mechanical strength by filling the porous interior thereof with, in particular, silicone rubber among the above-described rubbers.

Of the various rubber materials, silicone rubber, particularly dimethylsiloxane polymer and copolymer are used in combination, because its gas permeability is highest. In addition, phenylsiloxane polymer and copolymer in which a phenyl group is incorporated in addition to the methyl group, vinylsiloxane polymer and copolymer in which a vinyl group is incorporated, fluorosiloxane polymer and copolymer in which several methyl groups are partially replaced by a trifluoropropyl group, and nitrilosilicone rubber in which a cyanopropyl group is incorporated, can be used.

As is the case with the usual silicone rubber, these siloxane polymer compounds can be vulcanized in the porous interior or on the surface of the heat resistant porous polymer membrane by organic peroxides, aliphatic acid azo compounds, sulfur, radiation, etc.

For the selectively gas-permeable composite membrane it is not only required that the material per se has excellent characteristics, but also the constitutive members controlling its permeability must be as thin as possible. That is, the evaluation of the characteristics of the material is expressed in the unit of coefficient of gas permeation:

$$P = cm^3 \cdot cm/cm^2 \cdot sec \cdot cm\, Hg$$

This is calculated with the thickness of the material as 1 cm. On the other hand, in the case of the composite membrane, it is expressed in the unit of permeation rate for the thickness per se of the material:

$$P = cm^3/cm^2 \cdot sec \cdot cm\, Hg$$

Although the permeation rate at a thickness of 1 micron is 10 times that at a thickness of 10 microns, the coefficient of permeation is the same in both cases. The permeation rate is a value which is necessary for practical use.

After the siloxane compound takes a cross-linked structure, a plasma polymerized thin membrane having a thickness of 1 micron or less, preferably 0.3 micron or less is deposited on the surface of the cross-linked siloxane compound. A mixed gas of non-polymerizable gas and polymerizable organosilane-based monomer gas, or organosilane-based monomer gas alone is introduced into a reactor which has been maintained at a reduced pressure of 5 Torr or less, preferably 2 Torr or less and more preferably 0.05 to 2 Torr. When glow discharge due to high frequency is produced in the reactor at an output of from 5 to 500 w, preferably 5 to 150 w, e.g., 20 w, the polymerizable organosilane-based monomer gas undergoes plasma polymerization, forming a thin membrane. This thin membrane deposits on the surface of the composite structure polymer support comprising the cross-linked siloxane compound and the heat resistant porous polymer membrane. The thickness of the deposited membrane varies in a nearly straight relation with the period of glow discharge or with the flow rate of the organosilane-based monomer. For example, a deposited membrane having a thickness of 1 micron or 0.3 micron can be formed by appropriately choosing the discharge time and the flow rate. A membrane having a thickness of 0.3 micron or less can be deposited in 15 to 30 minutes.

The thickness of the deposited membrane can also be changed by controlling the output for glow discharge. These conditions can be optimized relatively easily by one skilled in this field. Changes in conditions from the formation of the thin membrane to the deposition of fine particles can be easily controlled by the flow rate of the polymerizable organosilane-based monomer gas. In any case, it is necessary to deposit a uniform polymerization membrane, which is free from any defects, in a thickness of 0.3 micron or less.

Since the thickness of the plasma polymerization thin membrane is as thin as 1 micron or less, or 0.3 micron or less, those polymerizable organosilane-based monomers must be selected whether they can permeate one component of a mixed gas to be subjected to gas saparation or not. The cross-linked siloxane compounds are characterized by having very good gas permeability. However, their selective permeability of mixed gas is very inferior. Even so, the deposition of plasma polymerized thin members of the organosilane on the cross-linked siloxane compound makes it possible to greatly increase the selective permeability. In this way, the gas selective permeability of the resulting composite membrane can be increased up to 10 times or more that of the cross-linked siloxane compound without seriously deteriorating the permeability thereof.

The heat resistance and selective permeability of the composite membrane will hereinafter be explained.

Polymeric materials resulting from ion polymerization or radical polymerization contain no, or almost no cross-linked structure in the main chain thereof, whereas polymers produced by plasma polymerization contain many cross-linked structures in the main chain thereof. That is, in the plasma polymerization of the organosilane-based monomer, the monomer is always attacked by electrons from plasma during the process in which it is polymerized and grows as a main chain. Thus, a dehydrogen reaction occurs at random, producing radicals on the main chain, and the formation of such radicals leads to branching and cross-linking.

Accordingly, the presence of two or more double bonds, or a triple bond in the organosilane-based monomer accelerates the production of branches and a cross-linked structure. Under specific conditions, a fairly large number of double bonds or radicals may still be allowed to remain even after the deposition of the plasma-polymerized membrane. Thus, by utilizing these active points at the post-treatment step, the cross-linking density can be further increased. This adjustment of the cross-linking density of the composite membrane increases its ability to select the molecular size of a mixed gas to be subjected to gas separation. Compared with polymers resulting from ion polymerization or radical polymerization using the same monomers, the polymers produced by plasma polymerization are further increased in non-crystallinity, heat resistance, insolubility in organic solvents, density and so forth. The conversion of a crystalline polymer into a non-crystalline one increases gas permeability. The less-solubilization of polymers in organic solvents increases their chemical resistance. Increasing the density leads to an increase in selective permeability. These improvements are particularly preferred for the selectively gas-permeable composite membrane. In particular, the improvement of increasing the maximum temperature than can be employed for practical use is a fundamental one which could not be attained by other polymerization methods.

Curling and cracking due to the internal stress of the plasma-polymerized membrane will hereinafter be explained.

In general, plasma-polymerized membranes produced from hydrocarbon monomers are increased in cross-link density by a dehydrogenation reaction, and finally, they are bent; i.e., so many dehydrogenation reaction readily causes a phenomenon called "curling". If the curling further proceeds, for example, in a case in which the thin membrane is deposited in a thickness of 1 micron or more, cracks may be formed in the membrane.

On the other hand, the present inventors have unexpectedly found that almost no curling occurs with plasma-polymerized membranes produced from organosilane-based monomers. This is considered due to the fact that the angle of rotation of an Si atom in a C—Si—C bond is greater than that of a C atom in a C—C—C bond. When, however, the number of double bonds is increased, or all the triple bonds are used in the polymerization and cross-linking reactions, the proportion of the C—C—C bond becomes greater than that of the C—Si—C, and the curling phenomenon may occur. Even though the curling phenomenon occurs, the extent of curling is much smaller than that in the plasma polymerized membranes produced from hydrocarbon monomers. Furthermore, by appropriately choosing the cross-linking conditions, the frequency of cracking can be greatly decreased.

The composite membrane produced under the very limited conditions as described above is superior with respect to its selective permeability of mixed gas, and therefore, is industrially very useful for an energy-saving gas separation process.

Any conventional apparatus for plasmapolymerization can be used. For example, an apparatus shown in the FIGURE can be used. in the FIGURE, a reactor 7 is an inner electrode type plasma polymerization reactor having therein a pair of parallel plate electrodes 8 and 9 confronting each other. The upper electrode 8 uses punching metal. The reactor 7 is covered with a quartz glass 3 sealed with a seal packing 4. On production, a substrate or polymeric material support 12 is placed on the lower electrode 9 and then the pressure inside the reactor 7 is reduced to 0.01 Torr or less by a vacuum pump 6, monitoring the pressure with a pressure gauge 5. Monomer contained in a monomer vessel 1 is supplied to the reactor 7 with being adjusted its flow rate with a flow meter 2. Then, electric power is supplied from a power supply 11 to generate glow discharge in the reactor. Reflecting power is adjusted to become minimum with a matching box 10. After a predetermined time, supply of electric power and monomer is stopped, the pressure inside the reactor is elevated to the atmospheric pressure, and polymer deposited on the support is taken out.

The present invention is described in greater detail by reference to the following examples. However, the invention is not limited in scope to these examples.

EXAMPLE 1

Dimethyl polysiloxane (SH55u, produced by Toray Silicon Co., Ltd.) partially containing a vinyl group was dissolved in toluene, and 2,4-dichlorobenzoyl peroxide as a vulcanizing agent was added thereto to prepare a 20% by weight solution of dimethyl polysiloxane.

The solution was coated on a porous membrane of a polytetrafluoroethylene resin (FLUOROPORE FP-022, produced by Sumitomo Electric Industry Ltd.) having an average pore diameter of 0.22 micron by means of a doctor knife, and then, cross-linked by heating at 115° C. for 5 minutes and subsequently at 200° C. for 30 minutes.

In these procedures, a uniform thin dimethyl polysiloxane membrane having a thickness (as determined by a weight method) of about 9 microns was coated on the support membrane. In connection with the gas selective permeability of the composite membrane, the oxygen permeation rate was $7.2 \times 10^{-5}$ cm$^3$ (STP)/cm$^2$·sec·cm Hg, and the selectivity of oxygen and nitrogen was 2.0.

The composite membrane was placed and fixed in a reactor of a plasma polymerization apparatus shown in the FIGURE. After evacuation of the reactor, trimethylvinylsilane was introduced thereinto in a vapor state and polymerized to deposit on the composite membrane. In this plasma polymerization, the high frequency electric power was 30 watt, and the polymerization time was 20 minutes. As a result, there was deposited a plasma polymerized membrane having a thickness (as calculated from an increased weight) of about 0.25 micron.

The gas selective permeability of the composite structure membrane was measured; the oxygen permeation rate was $3.3 \times 10^{-5}$ cm$^3$ (STP)/cm$^2$·sec·cm Hg, and the selectivity of oxygen and nitrogen was 3.3.

EXAMPLES 2 TO 5

On the same composite support membrane as used in Example 1 was deposited a plasma polymerized membrane of each of various silane compounds containing at least one double bond or triple bond. The polymerization conditions are shown in Table 1, and the characteristics of the three-layer structure membranes produced, in Table 2. It can be seen that in any case the gas selective permeability of the composite membrane support is greatly improved.

TABLE 1

| Run No. | Type of Silane Compound | Plasma Operation Conditions | | |
| --- | --- | --- | --- | --- |
| | | Electric Power (w) | Pressure (Torr) | Time (min) |
| Example 2 | Allyltrimethylsilane | 100 | 0.5 | 20 |
| Example 3 | Ethynyltrimethylsilane | 20 | 0.3 | 15 |
| Example 4 | Methyltrivinylsilane | 20 | 0.3 | 20 |
| Example 5 | Dimethylvinylchlorosilane | 20 | 0.3 | 15 |

TABLE 2

| Run No. | Thickness of Plasma Polymerized Membrane ($\mu$) | Characteristics of Composite Membrane | |
| --- | --- | --- | --- |
| | | Oxygen Permeation Rate | Coefficient of Separation ($O_2/N_2$) |
| Example 2 | 0.38 | $2.3 \times 10^{-5}$ | 3.5 |
| Example 3 | 0.15 | $2.2 \times 10^{-5}$ | 3.8 |
| Example 4 | 0.22 | $3.5 \times 10^{-6}$ | 5.2 |
| Example 5 | 0.28 | $4.6 \times 10^{-6}$ | 4.9 |

EXAMPLES 6 TO 12

In these examples, a porous membrane of polypropylene (Julaguard No. 2400, produced by Polyplastic Co., Ltd.) having an average pore diameter of 0.04 micron was used as a support. On this support was deposited a plasma polymerized membrane of each of various silane compounds containing at least one double bond or triple bond under the conditions shown in Table 3. The gas selective permeability of each of the thus-produced composite structure membranes is shown in Table 4. In these examples, there were obtained selectively gas-permeable composite membranes which had high permeability although their selectivities were slightly reduced compared with Examples 2 to 5.

TABLE 3

| Run No. | Type of Silane Compound | Plasma Operation Conditions | | |
| --- | --- | --- | --- | --- |
| | | Electric Power (w) | Pressure (Torr) | Time (min) |
| Example 6 | Trimethylvinylsilane | 30 | 0.3 | 15 |
| Example 7 | Trimethylvinylsilane | 30 | 0.5 | 20 |
| Example 8 | Trimethylvinylsilane | 50 | 0.5 | 20 |
| Example 9 | Allyltrimethylsilane | 100 | 0.5 | 20 |
| Example 10 | Ethynyltrimethylsilane | 20 | 0.5 | 15 |
| Example 11 | Methyltrivinylsilane | 20 | 0.5 | 20 |
| Example 12 | Dimethylvinylchlorosilane | 40 | 0.5 | 15 |

TABLE 4

| Run No. | Thickness of Plasma Polymerized Membrane ($\mu$) | Gas Selective Permeability of Composite Structure Membrane | |
| --- | --- | --- | --- |
| | | Oxygen Permeation Rate | Coefficient of Separation ($O_2/N_2$) |
| Example 6 | 0.15 | $1.2 \times 10^{-4}$ | 2.6 |
| Example 7 | 0.27 | $9.0 \times 10^{-5}$ | 2.8 |
| Example 8 | 0.38 | $4.4 \times 10^{-5}$ | 3.2 |
| Example 9 | 0.36 | $4.2 \times 10^{-5}$ | 3.0 |
| Example 10 | 0.31 | $2.9 \times 10^{-5}$ | 3.3 |
| Example 11 | 0.39 | $4.2 \times 10^{-6}$ | 3.9 |
| Example 12 | 0.41 | $9.5 \times 10^{-6}$ | 3.9 |

While the invention has been described in detail and with reference to specific embodiments thereof, it will be apparent to one skilled in the art that various changes and modifications can be made therein without departing from the spirit and scope thereof.

What is claimed is:

1. A selectively gas-permeable membrane comprising a polymeric material support and a thin membrane desposited on the support, said thin membrane being obtained by glow discharge plasma polymerization of an organosilane compound containing at least one double bond or triple bond.

2. The membrane as claimed in claim 1, wherein the organosilane compound is represented by the formula:

$$R_n-Si-X_{4-n}$$

wherein
 n = 1 to 4;
 R = $CH_2=CH-$, $CH\equiv C-$, or $CH_2=CH-CH_2-$; and
 X = H, Cl, $CH_3-$, or $CH_3-CH_2-$.

3. The membrane as claimed in claim 1, wherein the boiling point at atmospheric pressure of the organosilane compound is 130° C. or lower.

4. The membrane as claimed in claim 1, wherein the organosilane compound is selected from the group consisting of dimethylvinylchlorosilane, trimethylvinylsilane, methyltrivinylsilane, tetravinylsilane, ethynyltrimethylsilane, and allyltrimethylsilane.

5. The membrane as claimed in claim 1, wherein the polymeric material support comprises a coating of polyorganosiloxane coated and cross-linked on a porous polymeric material membrane having an average pore diameter of at least 0.1 micron.

6. The membrane as claimed in claim 1, wherein the polymeric material support has an average pore size of 0.1 micron or less.

7. The membrane as claimed in claim 5, wherein the polyorganosiloxane compound contains a phenyl group or a vinyl group.

8. A process for producing a selectively gas-permeable membrane comprising the steps of:
 providing a polymeric material support in a vessel wherein; (i) the support is a porous polymeric material membrane having an average pore diameter of 0.1 micron or less or, (ii) the support is prepared by coating a solution of polyorganosiloxane on a porous polymeric material membrane having an average pore diameter of at least 0.1 micron, evaporating the solvent, and thereafter, hardening or cross-linking said polyorganosiloxane;
 introducing an organosilane compound containing at least one double bond or triple bond in a vapor form into the vessel with an atmosphere maintained at 5 torr or less; and
 plasma-polymerizing said compound by application of glow discharge to deposit it on the polymeric material support.

9. The process as claimed in claim 8, wherein the organosilane compound is represented by the formula:

$$R_n-Si-X_{4-n}$$

wherein
 n = 1 to 4;
 R = $CH_2=CH-$, $CH\equiv C-$, or $CH_2=CH-CH_2-$; and
 X = H, Cl, $CH_3-$, or $CH_3CH_2-$.

10. A selectively gas-permeable membrane as claimed in claim 1, wherein the organosilane compound is a compound selected from the group consisting of dimethylvinylchlorosilane, trimethylvinylsilane, methyltrivinylsilane, tetravinylsilane, ethynyltrimethylsilane, allyltrimethylsilane, monomethylvinylsilane, allyldimethylvinylsilane, allyldimethylsilane, and allyldimethylchlorosilane.

11. A process as claimed in claim 8, wherein the reduced pressure is 2 Torr or less at a high frequency at an output of from 5 to 150 w.

* * * * *